H. A. REMINGTON.
Clutch.

No. 208,494.  Patented Oct. 1, 1878.

Witnesses:
J. E. Arnold,
H. A. Arnold

Inventor:
Horatio A. Remington
By Atty Benj Arnold

UNITED STATES PATENT OFFICE.

HORATIO A. REMINGTON, OF RIVER POINT, RHODE ISLAND.

IMPROVEMENT IN CLUTCHES.

Specification forming part of Letters Patent No. 208,494, dated October 1, 1878; application filed July 3, 1878.

*To all whom it may concern:*

Be it known that I, HORATIO A. REMINGTON, of River Point, in the county of Kent and State of Rhode Island, have invented certain Improvements in Friction-Clutches, of which the following is a specification:

This invention consists in a novel construction and arrangement of the levers, friction-plates, and arms, in connection with the hub and sliding collar.

Figure 1:
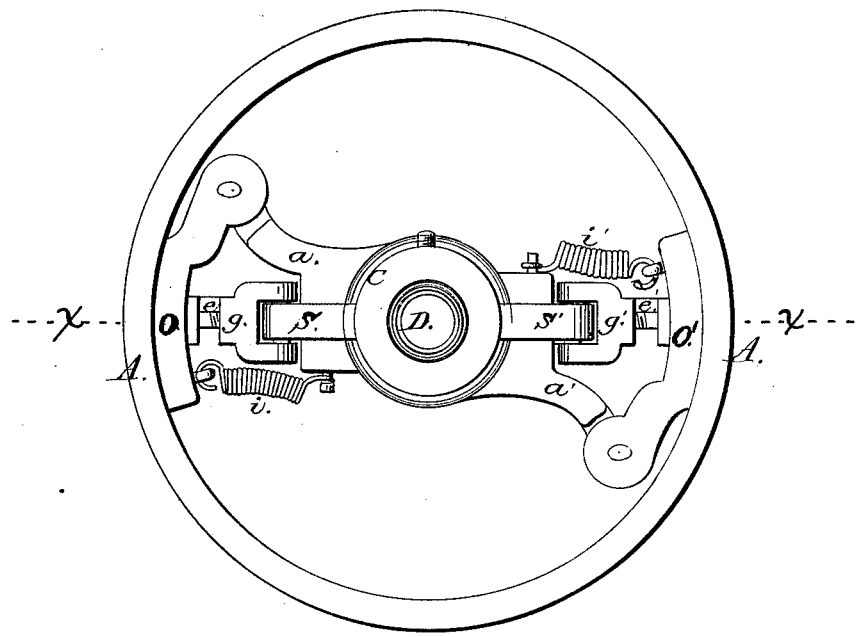
Figure 2:
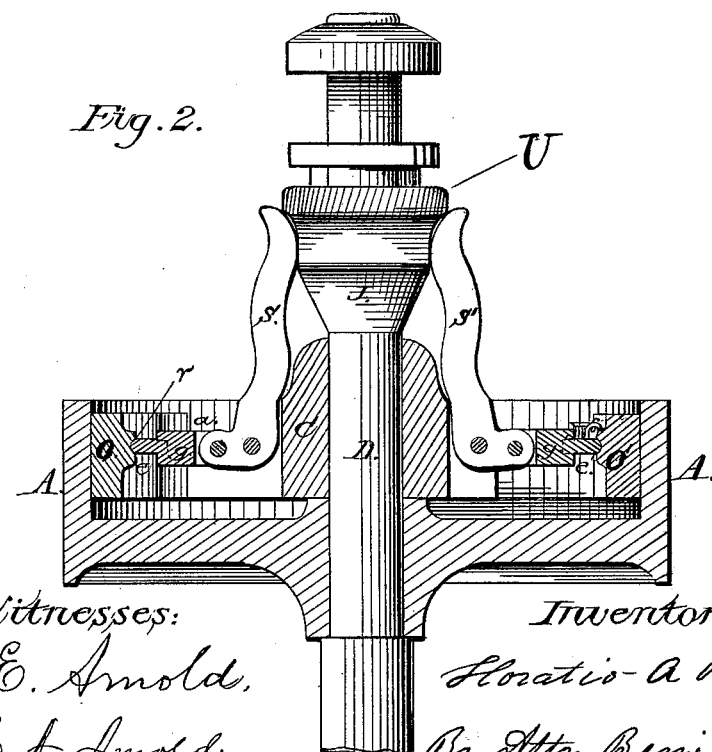

Figure 1 shows an end view of the pulley. Fig. 2 shows a section of the pulley taken through the lines $x$ $x$ in Fig. 1.

A is a box-pulley in the usual form—that is, a hub with a projecting flange and flat rim. This pulley is loose on the shaft D.

C is a hub keyed fast on the shaft. $a$ $a'$ are two arms projecting from opposite sides of the hub C. They are set off at the hub to allow the two knee-levers S S' to have bearings on the hub over the center of the shaft and by the sides of the arms.

Two friction-plates, O O', are hinged to the outer ends of the arms $a$ $a'$, and are so curved on their outer surfaces that they will fit the inner surface of the pulley-rim. A joint-block, $g$ $g'$, is pivoted to the inner end of each of the knee-levers S S', and short rods $e$ $e'$ are inserted in each block, with screw-threads on them, whereby they can be screwed in or out to shorten or lengthen them, as may be necessary. The outer ends of these rods $e$ $e'$ are rounded, and rest in recesses in the inner surfaces of the friction-plates O O'.

The holes $r$, in which the pins at the joints of the friction-plates and the arms are inserted, are made oval in the direction of the center of the shaft, to allow the hinged ends of the friction-plates to move in and out to enable the plates to fit themselves to the inner surface of the rim, which would otherwise require much work to fit, and which would be rendered ineffective by wear.

A spiral spring, $i$ $i$, is attached to each friction-plate near its outer end, the other end of the spring being fastened to a pin in the hub. These springs are for the purpose of withdrawing the plates from contact with the pulley-rim when they are not pressed up by the levers S S'.

J is a collar, made to slide loosely on the shaft, and has a groove in it to receive the forked end of a shipper-lever. The end of this collar is made tapering, so that it will slide in under the ends of the knee-levers and raise them, and is provided with a locking-surface that the outer ends of the knee-levers rest on when the collar is forced underneath said ends.

The operation is as follows: The pulley A is driven continuously by a belt, and by sliding the collar J, by means of a shipper-lever, in under the knee-levers, their outer ends will be raised and their inner ends thrown in, thereby pressing the friction-plates out with a toggle-motion of great force, so that the pulley will drive the shaft. When the collar is in, the ends of the levers rest on the straight surface of it, so that no pressure is required on the lever to hold the collar in. A reverse motion of the lever will throw the collar out, releasing the knee-levers, and allowing the springs to draw in the friction-plates, when the pulley will be free to revolve loosely on the shaft again.

Having thus described my improvement, what I claim as my invention is—

The combination of the hub C, having arms formed thereon, hinged friction-plates O O', knee-levers S S', collar J, provided with a locking-surface, blocks $g$ $g'$, rods $e$ $e'$, and pulley A, substantially as and for the purpose specified.

HORATIO A. REMINGTON.

Witnesses:
WM. E. BRAYTON,
THOS. M. HOLDEN.